United States Patent
Mitan et al.

(10) Patent No.: US 12,401,577 B2
(45) Date of Patent: Aug. 26, 2025

(54) TECHNIQUES FOR AUTOMATIC SERVICE LEVEL AGREEMENT GENERATION

(71) Applicant: Rubrik, Inc., Palo Alto, CA (US)

(72) Inventors: Pranav Mitan, Gurugram (IN); Disha Singla, Patiala (IN); Yashaswa Jain, Jabalpur (IN); Vinodkumar Subramanian, Bangalore (IN); Ravi Lakhotia, Bangalore (IN); Vijay Harihara Iyer Sankar, Bangalore (IN); Venkata Santhosh Kumar Tangudu, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 291 days.

(21) Appl. No.: 18/115,763

(22) Filed: Feb. 28, 2023

(65) Prior Publication Data
US 2024/0291731 A1    Aug. 29, 2024

(51) Int. Cl.
*H04L 41/5006* (2022.01)
*G06F 11/14* (2006.01)

(52) U.S. Cl.
CPC ...... *H04L 41/5006* (2013.01); *G06F 11/1464* (2013.01)

(58) Field of Classification Search
CPC .............. G06F 11/1461; G06F 11/1464; H04L 41/5006
See application file for complete search history.

(56) References Cited

U.S. PATENT DOCUMENTS

| | | | |
|---|---|---|---|
| 2019/0220369 A1* | 7/2019 | Liu | G06F 11/1451 |
| 2019/0258549 A1* | 8/2019 | Abdul Kadar | G06F 11/0709 |
| 2021/0158201 A1* | 5/2021 | Arra | G06N 20/00 |
| 2021/0255926 A1* | 8/2021 | Wang | G06N 5/04 |
| 2021/0263770 A1* | 8/2021 | Liu | G06F 11/1461 |

* cited by examiner

*Primary Examiner* — Gil H. Lee
(74) *Attorney, Agent, or Firm* — Holland & Hart LLP

(57) ABSTRACT

Methods, systems, and devices for data management are described. A data management system (DMS) may receive a request to backup data from a source data storage environment to a target data storage environment. The DMS may then input first workload metadata associated with backing up the data from the source data storage environment to the target data storage environment into a machine learning model that is trained using second workload metadata associated with a set of workloads managed by the data management system. The DMS may generate, via the machine learning model and in response to the request, one or more service level agreement configurations for backing up the data. Then, the DMS may perform the backup of the data from the source data storage environment to the target data storage environment in accordance with at least one of the one or more service level agreement configurations.

20 Claims, 10 Drawing Sheets

TECHNIQUES FOR AUTOMATIC SERVICE LEVEL AGREEMENT GENERATION

FIELD OF TECHNOLOGY

The present disclosure relates generally to data management, including techniques for techniques for automatic service level agreement generation.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system (DMS) may include a distributed system (e.g., a system with multiple distributed nodes or clusters of nodes) to support performing data backup for databases. Such data backup often includes implementing a service level agreement to establish one or more parameters for backing up data. For example, a service level agreement may specify a number of retention days, a number of archival days, replication information, etc. for backing up from a source environment to a target environment. Often times, an expert creates a service level agreement that may be dependent on application-specific expertise. Additionally, the process of identifying a correct service level agreement for a data backup may cause increase in cost and effort, among other issues.

One or more aspects of the present disclosure provides solutions for automatically identifying and implementing a service level agreement for backing up a database file. The DMS may train a machine learning model using a set of service level agreements. In some examples, the DMS may implement a K-means clustering (or similar technique) that uses various attributes to train the machine learning model. For instance, the DMS may access multiple service level agreements implemented by a customer and/or recommended by an administrator of the DMS. Upon receiving a new request for backing up data from a source data storage environment to a target data storage environment, the DMS may implement the machine learning algorithm to identify the most frequently used service level agreement configuration levels for a data backup, among other attributes or patterns. In some examples, the DMS may also identify the workload associated with backing up data from a source environment to a target environment. Then, based on running the machine learning model on the workload, the DMS may identify a recommended service level agreement for that workload. Once a service level agreement is deployed for a particular workload, the techniques depicted herein provide for periodic assessment of the service level agreement. For instance, the DMS may determine whether there has been any change in the workload or attributes of the workload. Based on that, the DMS may provide an updated recommendation for a service level agreement that may be more suited to the modified workload.

Figure 1:
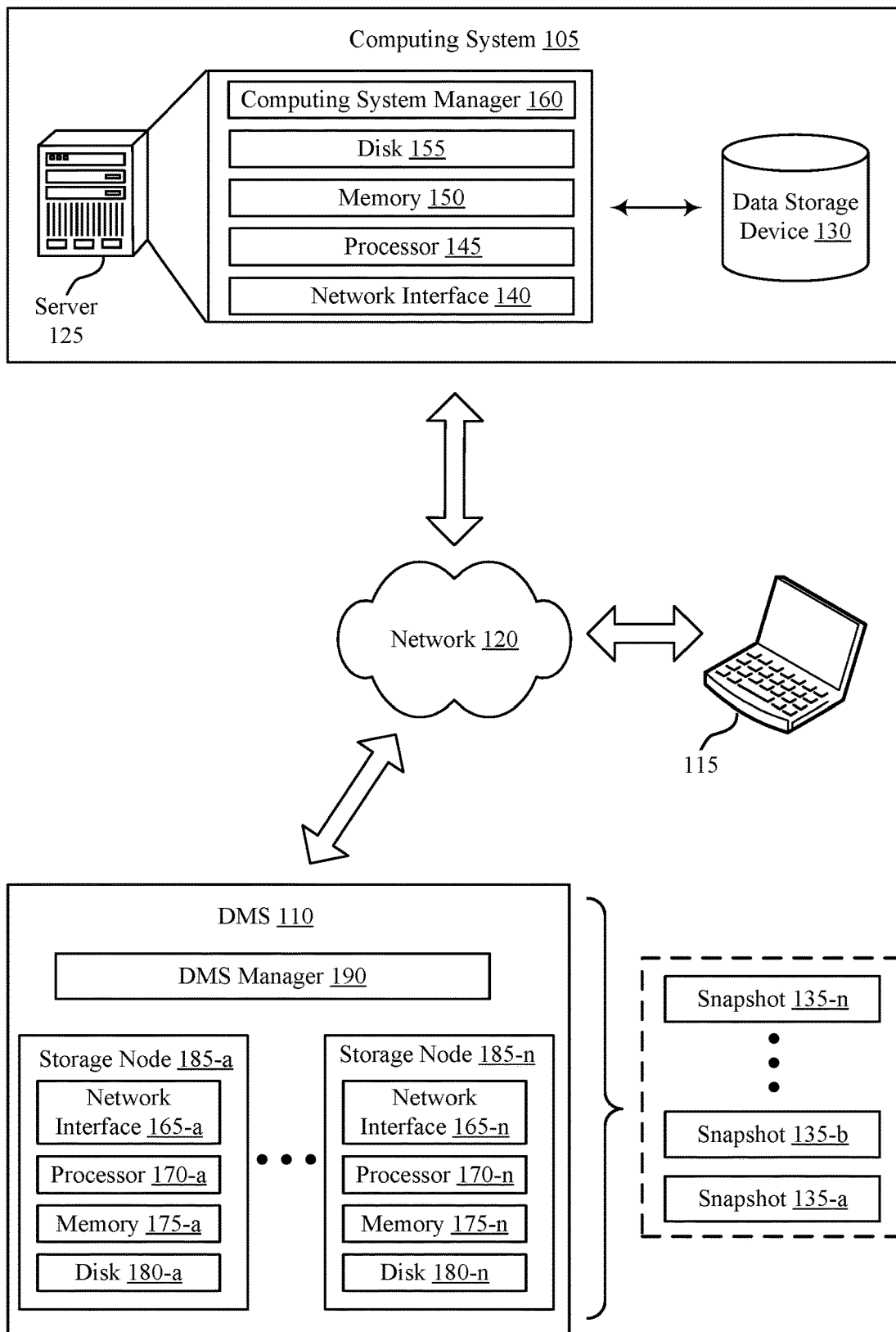
FIG. 1 illustrates an example of a computing environment that supports techniques for automatic service level agreement generation in accordance with aspects of the present disclosure.

FIG. 1 illustrates an example of a computing environment 100 that supports techniques for automatic service level agreement generation in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160) may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

A computing environment including the DMS 110 may receive a request to backup data from a source data storage environment to a target data storage environment. The DMS 110 may input first workload metadata associated with backing up the data from the source data storage environment to the target data storage environment into a machine learning model that is trained using second workload metadata associated with a set of workloads managed by the DMS 110. In some examples, the DMS 110 may generate, via the machine learning model and in response to the request, one or more service level agreement configurations for backing up the data from the source data storage environment to the target data storage environment. The DMS 110 may then perform the backup of the data from the source data storage environment to the target data storage environment in accordance with at least one of the one or more service level agreement configurations.

Figure 2:
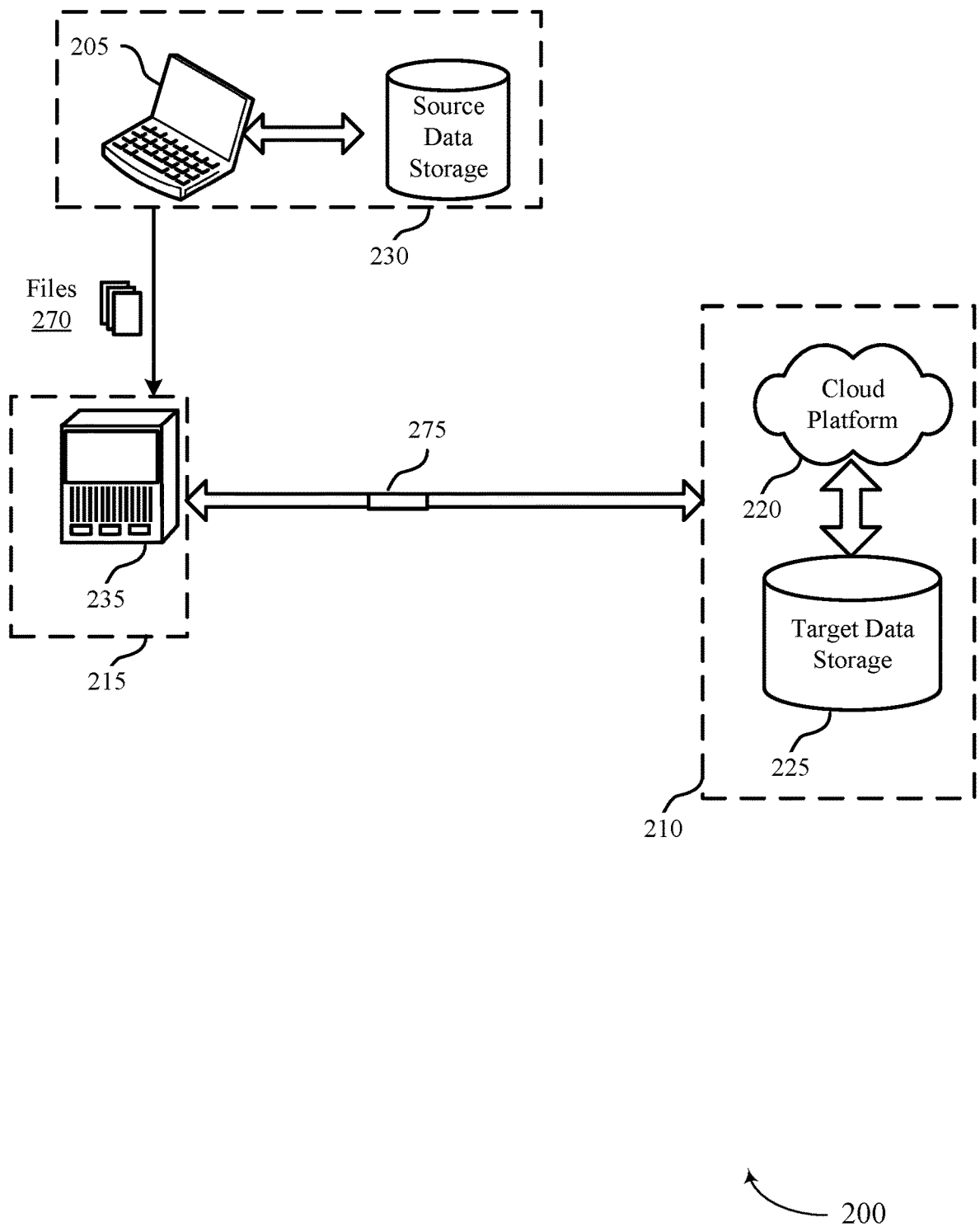
FIG. 2 illustrates an example of a computing system that supports techniques for automatic service level agreement generation in accordance with aspects of the present disclosure.

FIG. 2 illustrates an example of a computing system 200 that supports techniques for automatic service level agreement generation in accordance with aspects of the present disclosure. The computing system 200 includes a user device 205, a source data storage 230, a DMS 210 and a data manager 215. The DMS 210 may be or include a data storage infrastructure. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The DMS 210 may include a target data storage 225 (e.g., first storage node or a distributed storage node). Although not depicted herein, the DMS 210 may include more than one target data storage 225. Multiple target data storages 225 (e.g., storage nodes of a distributed storage architecture) may be geographically separated from each other. As depicted in the example of FIG. 2, the DMS 210 may include a cloud platform 220. The cloud platform 220 may offer an on-demand storage and computing services to the user device 205. In some cases, the DMS 210 may be an example of a storage system with built-in data management. The DMS 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 may support a large number of production databases running on clustered setups. In some examples, such databases may have instances running across multiple nodes of a cluster (e.g., DMS 210 including a computing cluster). The computing system 200 may leverage the high availability and horizontal scalability of cluster configurations to distribute backup load evenly across the nodes in the DMS 210. Aspects depicted herein provide for using a data backup configuration to perform a backup of data from the source data storage 230 to a target data storage environment (e.g., DMS 210 including the target data storage 225). In some examples, the source data storage 230 may include a larger number of files categorized as different workloads. Additionally, the target data storage environment may include a set of storage nodes (e.g., distributed storage nodes) managed by the data manager 215. Such data backup often includes implementing a service level agreement to establish one or more parameters for backing up data. For example, a service level agreement may specify a number of retention days, a number of archival days, replication information, etc. for backing up from a source environment to a target environment.

Aspects of the present disclosure provide for generating a policy for customers, where the policy includes at least one service level agreement. In some examples, the computing system 200 may identify the most used service level agreement configuration levels for a backup snapshot based on a machine learning algorithm (e.g., K-means clustering algorithm) using various attributes. In some examples, the data manager 215 may receive a request to backup data files 270 from the source data storage 230 to the target data storage 225. In some examples, the data manager 215 may identify a first workload metadata associated with backing up the data from the source data storage 230 to the target data storage 225. The customer's snapshot metadata may be stored in a database (e.g., Snowflake database) managed by or otherwise accessed by the DMS 210. In some examples, the data manager 215 in combination with the DMS 210 may input the first workload metadata associated with backing up the data from the source data storage 230 to the target data storage 225 into a machine learning model that is trained using second workload metadata associated with a set of workloads managed by the DMS 210. That is, the machine learning model may be trained using a set of prior workloads.

In some examples, the data manager 215 in combination with the DMS 210 may generate, via the machine learning model and in response to the request, one or more service level agreement configurations for backing up the data from the source data storage 230 to the target data storage 225. The one or more service level agreement configurations may be a recommended service level agreement configuration suited for the first workload. In some examples, the recommended service level agreement configuration may be based on an expert's recommendation. Additionally, or alternatively, the recommended service level agreement configuration may be generated based on the machine learning model. The expert's recommendation may be based on a particular workload considering business criticality, sensitive data in snapshots, resource usage and security etc. Once the service level agreement is identified, a cost estimator may calculate its costs based on its storage location and other attributes like replication and archival. In some examples, this cost may be or may include a breakdown of on-premises costs, cloud costs for storage and compute, and networking costs. In some examples, the data manager 215 in combination with the DMS 210 may perform the backup of the data from the source data storage 230 to the target data storage 225 in accordance with at least one of the one or more service level agreement configurations.

According to one or more aspects, the data manager 215 may be designed to continuously suggest policy updates. The data manager 215 may periodically receive insights based on security levels, workload sizes, business criticality, and costs. Using these insights, the data manager 215 may analyze existing service level agreements and may provide new recommendations to update the policy to either increase security or reduce cost. In some examples, the data manager 215 may collect metadata from all customers. There may be thousands of customers and the DMS 210 may store the metadata for each customer. Such metadata may act as a data mine for insights used in generating service level agreement configurations. The data collected in the data manager 215 may be exported to a database for observability and telemetry use cases.

In some examples, the data manager 215 in combination with the DMS 210 receiving a set of requests to backup data from the source data storage 230 to a target data storage 225, where the set of requests correspond to the set of workloads. The data manager 215 in combination with the DMS 210 may then generate a set of service level agreement configurations associated with the set of requests. In some examples, the data manager 215 in combination with the DMS 210 may train a machine learning model using the generated set of service level agreement configurations associated with the set of requests. For example, the data manager 215 in combination with the DMS 210 may train a machine learning model to identify a first subset of service level agreement configurations from the set of service level agreement configurations based on a set of attributes. Additionally, or alternatively, the DMS 210 may store the first subset of service level agreement configurations.

In some examples, the data manager 215 may support a machine learning based profile generator. In the machine learning based profile generator, a machine learning engine may be developed to periodically (e.g., weekly) consume this data, to cleanse and validate in preparation of further analysis. The data manager 215 in combination with the DMS 210 may run a machine learning algorithm, (e.g., a K-means clustering algorithm) to identify the cluster of profiles and its sizes based on a set of attributes. In some examples, the set of attributes may include at least one of a set of retention days per snapshot, a set of archival days per snapshot, replication information per snapshot, a set of cost configurations for one or more cloud environments, a set of snapshot sizes per service level agreement per snapshot, an industry associated with a customer, a business priority of the workload, or a combination thereof. Additionally, or alternatively, the data manager 215 may receive, from an administrator, a recommended service level agreement configuration for backing up the data from the source data storage 230 to the target data storage 225. The data manager 215 may identify a profile associated with the recommended service level agreement configuration. The data manager 215 may identify a profile and store the profile based on its attributes. The data manager 215 may push such a profile 275 to the DMS 210 (including the target data storage 225) as a most used policy. In some examples, an expert (e.g., administrator) may create profile policies based on their expertise which may be shown as recommended policy and stored in the same database.

When creating a new service level agreement, the data manager 215 may receive a workload and may retrieve one or more parameters associated with the workload upon receiving the request to backup data from the source data storage 230 to the target data storage 225. The data manager 215 may further perform a cost estimation for the workload based the one or more parameters. In some examples, the one or more parameters may include at least one of a set of workload sizes, a set of read trends, a set of write trends, a resource usage, a capacity, a set of licenses, or a combination thereof.

Additionally, or alternatively, the data manager 215 may update the service level agreement creation workflow to query an identified profile (from a profile creation workflow) based on one or more selected attributes. In some examples, the profile parameters (e.g., policy parameters) may be displayed as one of the choices for the customer to select. Once the customer selects the policy parameters, the data manager 215 in combination with the DMS 210 may use the policy parameters for cost estimation. In some examples, a cost estimator module may be inbuilt in the DMS 210. In some examples, the cost estimator module may store information about various cloud and on-premises cost profiles. The cost profiles may be updated weekly or monthly by one or more service teams. In some examples, the cost estimator may also query customer specific information such as workload sizes, read/write trends, resource usage, capacity and licenses. The cost estimator using the policy parameters, customer specific information and cloud cost profiles may determine the approximate cost for the chosen profiles. In some cases, this cost may be displayed to the customer as part of the service level agreement creation workflow. If the customer is in agreement with the cost, then they can proceed and create the service level agreement. Otherwise, the customer may return to updating the protection policy and may redo the costing exercise.

In some examples, the data manager 215 in combination with the DMS 210 may run a service level agreement assessment workflow. In some examples, a service level agreement assessment module may be run periodically (e.g., once in a month) to query all the service level agreements created previously. For example, the data manager 215 in combination with the DMS 210 may periodically perform an assessment of the one or more service level agreement configurations. The data manager 215 in combination with the DMS 210 may update at least one of the one or more service level agreement configurations based on the assessment. In some examples, the service level agreement assessment module may compare an old service level agreement with new sets of identified profiles (from profile creation workflow) based on the selected attributes. If the service level agreement policy is deviating, the service level agreement assessment module may check for deviation and its impact. In some examples, based on its impact, the service level agreement assessment module may create a recommendation for service level agreement updating. In some examples, the DMS 210 may generate a report periodically. The report may include the service level agreement assessment information as a report, which provides the deviation, impact and recommendations for the service level agreement profile.

Figure 3:
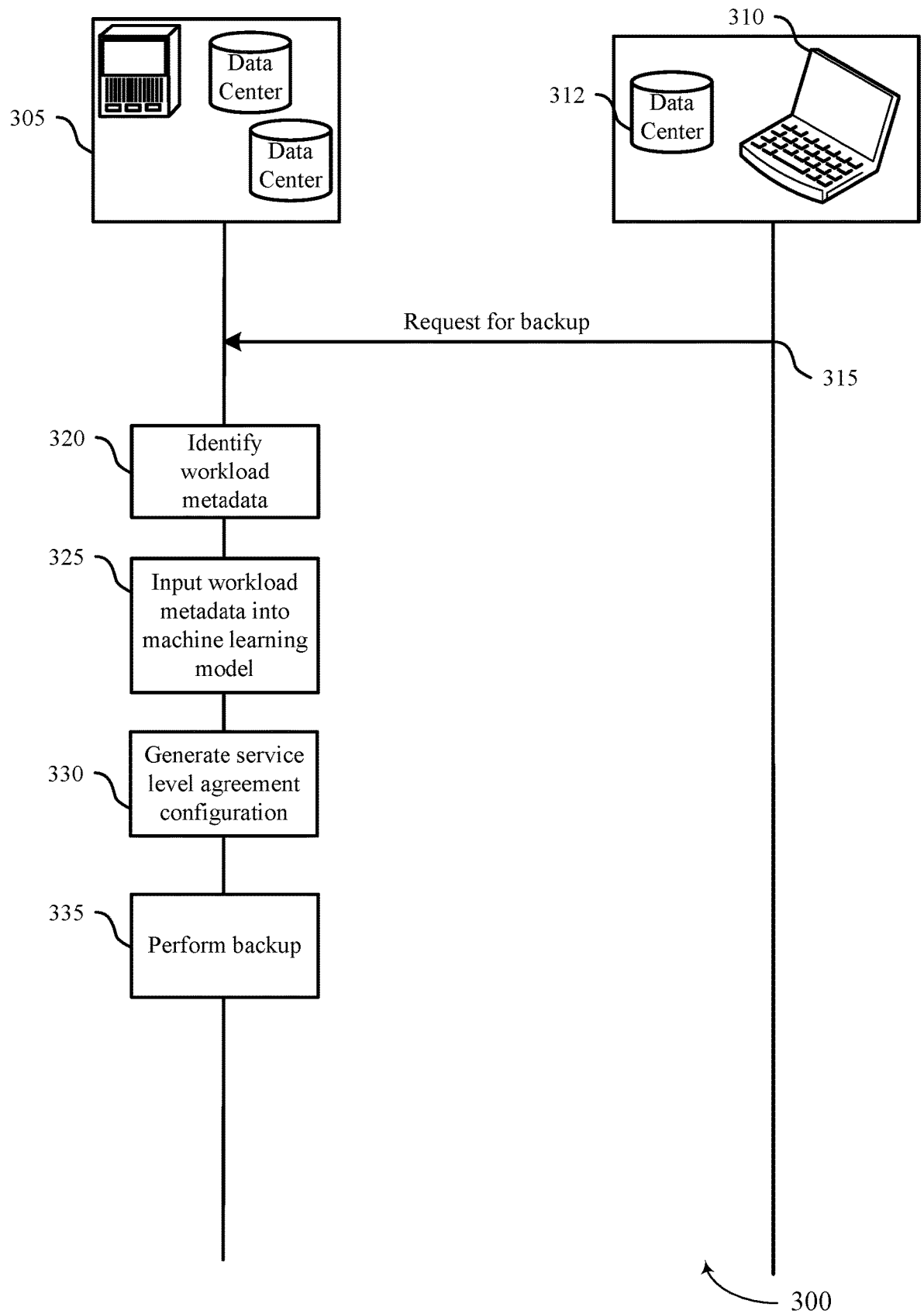
FIG. 3 illustrates an example of a process flow that supports techniques for automatic service level agreement generation in accordance with aspects of the present disclosure.

FIG. 3 illustrates an example of a process flow 300 that supports techniques for automatic service level agreement generation in accordance with aspects of the present disclosure. The process flow 300 includes a data management system 305 including a target data storage environment and a user device 310 including a source data storage environment 312. The data management system 305 may include an application server, and multiple data centers of a computing cluster as described with respect to FIGS. 1 and 2. The source data storage environment 312 may include a first set of data files managed by a user of a data management system 305. The data management system 305 may include a target data storage environment for backing up of the first set of data files. The user device 310 may be an example of a user device as described with respect to FIGS. 1 and 2. Although a single entity is depicted as data management system 305, it may be understood that components of the data management system 305 may be located in different locations.

In some examples, the operations illustrated in the process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 315, the data management system 305 may receive a request to backup data from a source data storage environment to a target data storage environment.

At 320, the data management system 305 may identify first workload metadata related to the request. At 325, the data management system 305 may input the first workload metadata associated with backing up the data from the source data storage environment to the target data storage environment into a machine learning model that is trained using second workload metadata associated with a set of workloads managed by the data management system. In some examples, the machine learning model may be a K-means clustering algorithm.

At 330, the data management system 305 may generate, via the machine learning model and in response to the request, one or more service level agreement configurations for backing up the data from the source data storage environment to the target data storage environment.

At 335, the data management system 305 may perform the backup of the data from the source data storage environment to the target data storage environment in accordance with at least one of the one or more service level agreement configurations.

Figure 4:
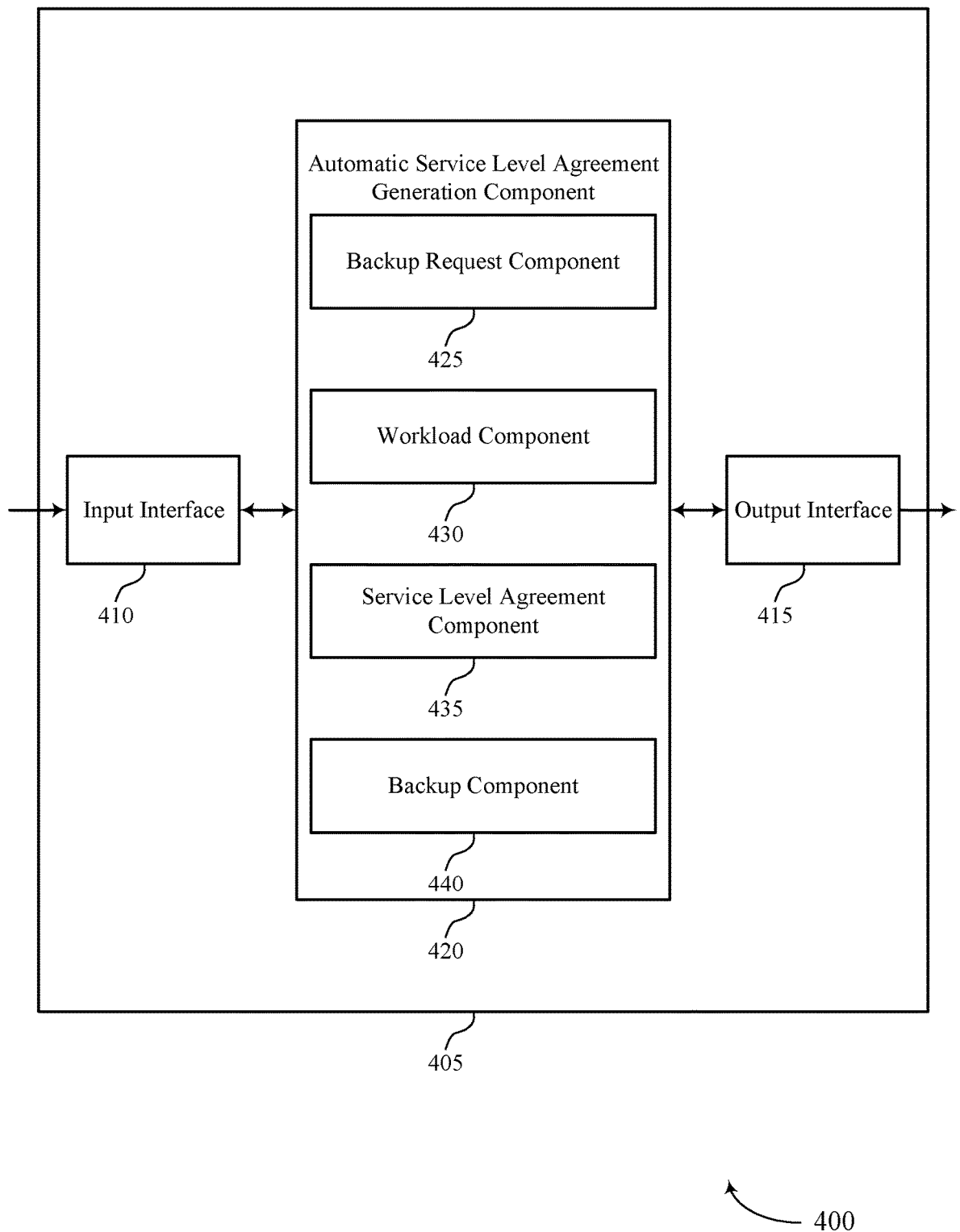
FIG. 4 illustrates a block diagram of an apparatus that supports techniques for automatic service level agreement generation in accordance with aspects of the present disclosure.

FIG. 4 illustrates a block diagram 400 of a system 405 that supports techniques for automatic service level agreement generation in accordance with aspects of the present disclosure. In some examples, the system 405 may be an example of aspects of one or more components described with reference to FIG. 1, such as a DMS 110. The system 405 may include an input interface 410, an output interface 415, and an automatic service level agreement generation component 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the automatic service level agreement generation component 420 to support techniques for automatic service level agreement generation. In some cases, the input interface 410 may be a component of a network interface 625 as described with reference to FIG. 6.

The output interface 415 may manage output signaling for the system 405. For example, the output interface 415 may receive signaling from other components of the system 405, such as the automatic service level agreement generation component 420, and may transmit such output signaling corresponding to (e.g., representative of or otherwise based on) such signaling to other systems or devices. In some cases, the output interface 415 may be a component of a network interface 625 as described with reference to FIG. 6.

For example, the automatic service level agreement generation component 420 may include a backup request component 425, a workload component 430, a service level agreement component 435, a backup component 440, or any combination thereof. In some examples, the automatic service level agreement generation component 420, or various components thereof, may be configured to perform various operations (e.g., receiving, monitoring, transmitting) using or otherwise in cooperation with the input interface 410, the output interface 415, or both. For example, the automatic service level agreement generation component 420 may receive information from the input interface 410, send information to the output interface 415, or be integrated in combination with the input interface 410, the output interface 415, or both to receive information, transmit information, or perform various other operations as described herein.

The automatic service level agreement generation component 420 may support automatic service level agreement generation in accordance with examples as disclosed herein. The backup request component 425 may be configured as or otherwise support a means for receiving, at a data management system, a request to backup data from a source data storage environment to a target data storage environment. The workload component 430 may be configured as or otherwise support a means for inputting first workload metadata associated with backing up the data from the source data storage environment to the target data storage environment into a machine learning model that is trained using second workload metadata associated with a set of multiple workloads managed by the data management system. The service level agreement component 435 may be configured as or otherwise support a means for generating, via the machine learning model and in response to the request, one or more service level agreement configurations for backing up the data from the source data storage environment to the target data storage environment. The backup component 440 may be configured as or otherwise support a means for performing the backup of the data from the source data storage environment to the target data storage environment in accordance with at least one of the one or more service level agreement configurations.

Figure 5:
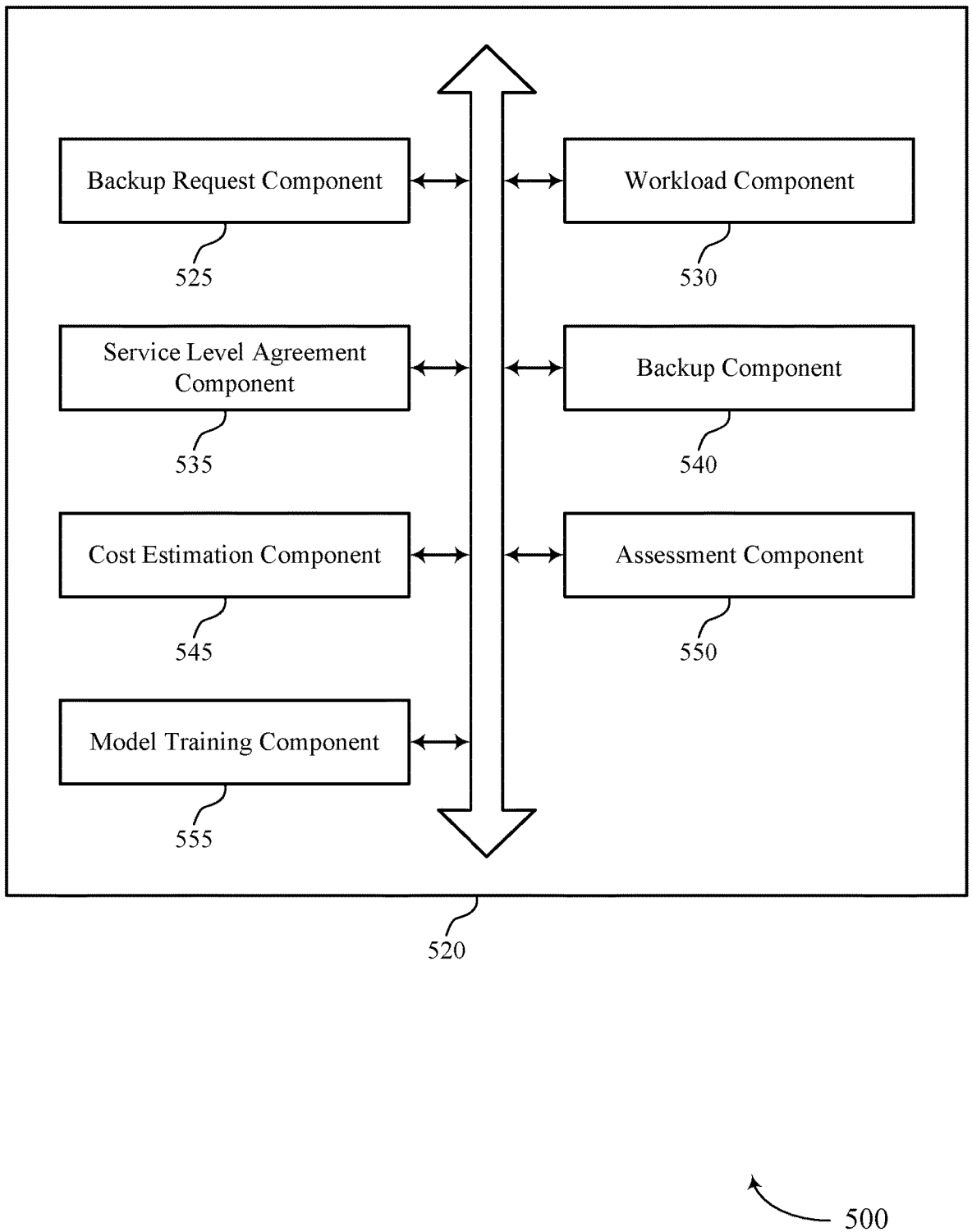
FIG. 5 illustrates a block diagram of an automatic service level agreement generation component that supports techniques for automatic service level agreement generation in accordance with aspects of the present disclosure.

FIG. 5 illustrates a block diagram 500 of an automatic service level agreement generation component 520 that supports techniques for automatic service level agreement generation in accordance with aspects of the present disclosure. The automatic service level agreement generation component 520 may be an example of aspects of an automatic service level agreement generation component 420, or both, as described herein. The automatic service level agreement generation component 520, or various components thereof, may be an example of means for performing various aspects of techniques for automatic service level agreement generation as described herein. For example, automatic service level agreement generation component 520 may include a backup request component 525, a workload component 530, a service level agreement component 535, a backup component 540, a cost estimation component 545, an assessment component 550, a model training component 555, or any combination thereof. Each of these components may communicate, directly or indirectly, with one another (e.g., via one or more buses, communications links, communications interfaces, or any combination thereof).

The automatic service level agreement generation component 520 may support automatic service level agreement generation in accordance with examples as disclosed herein. The backup request component 525 may be configured as or otherwise support a means for receiving, at a data management system, a request to backup data from a source data storage environment to a target data storage environment. The workload component 530) may be configured as or otherwise support a means for inputting first workload metadata associated with backing up the data from the source data storage environment to the target data storage environment into a machine learning model that is trained using second workload metadata associated with a set of multiple workloads managed by the data management system. The service level agreement component 535 may be configured as or otherwise support a means for generating, via the machine learning model and in response to the request, one or more service level agreement configurations for backing up the data from the source data storage environment to the target data storage environment. The backup component 540 may be configured as or otherwise support a means for performing the backup of the data from the source data storage environment to the target data storage environment in accordance with at least one of the one or more service level agreement configurations.

In some examples, the backup request component 525 may be configured as or otherwise support a means for receiving a set of multiple requests to backup data from the source data storage environment to a target data storage environment, where the set of multiple requests correspond to the set of multiple workloads. In some examples, the service level agreement component 535 may be configured as or otherwise support a means for generating a set of multiple service level agreement configurations associated with the set of multiple requests.

In some examples, the model training component 555 may be configured as or otherwise support a means for training the machine learning model to identify a first subset of service level agreement configurations from the set of multiple service level agreement configurations based on a set of attributes.

In some examples, the service level agreement component 535 may be configured as or otherwise support a means for storing the first subset of service level agreement configurations at the data management system.

In some examples, the set of attributes includes at least one of a set of retention days per snapshot, a set of archival days per snapshot, replication information per snapshot, a set of cost configurations for one or more cloud environments, a set of multiple snapshot sizes per service level agreement per snapshot, an industry associated with a customer, a business priority associated with the first workload, or a combination thereof.

In some examples, the service level agreement component 535 may be configured as or otherwise support a means for receiving, from an administrator, a recommended service level agreement configuration for backing up the data from the source data storage environment to the target data storage environment.

In some examples, the workload component 530 may be configured as or otherwise support a means for retrieving one or more parameters associated with a workload upon receiving the request to backup data from the source data storage environment to the target data storage environment. In some examples, the cost estimation component 545 may be configured as or otherwise support a means for performing a cost estimation for the workload based on the one or more parameters.

In some examples, the one or more parameters include at least one of a set of multiple workload sizes, a set of multiple read trends, a set of multiple write trends, a resource usage, a capacity, a set of multiple licenses, or a combination thereof.

In some examples, the assessment component 550 may be configured as or otherwise support a means for periodically performing an assessment of the one or more service level agreement configurations. In some examples, the service level agreement component 535 may be configured as or otherwise support a means for updating at least one of the one or more service level agreement configurations based on the assessment. In some examples, the machine learning model includes a K-means clustering algorithm.

Figure 6:
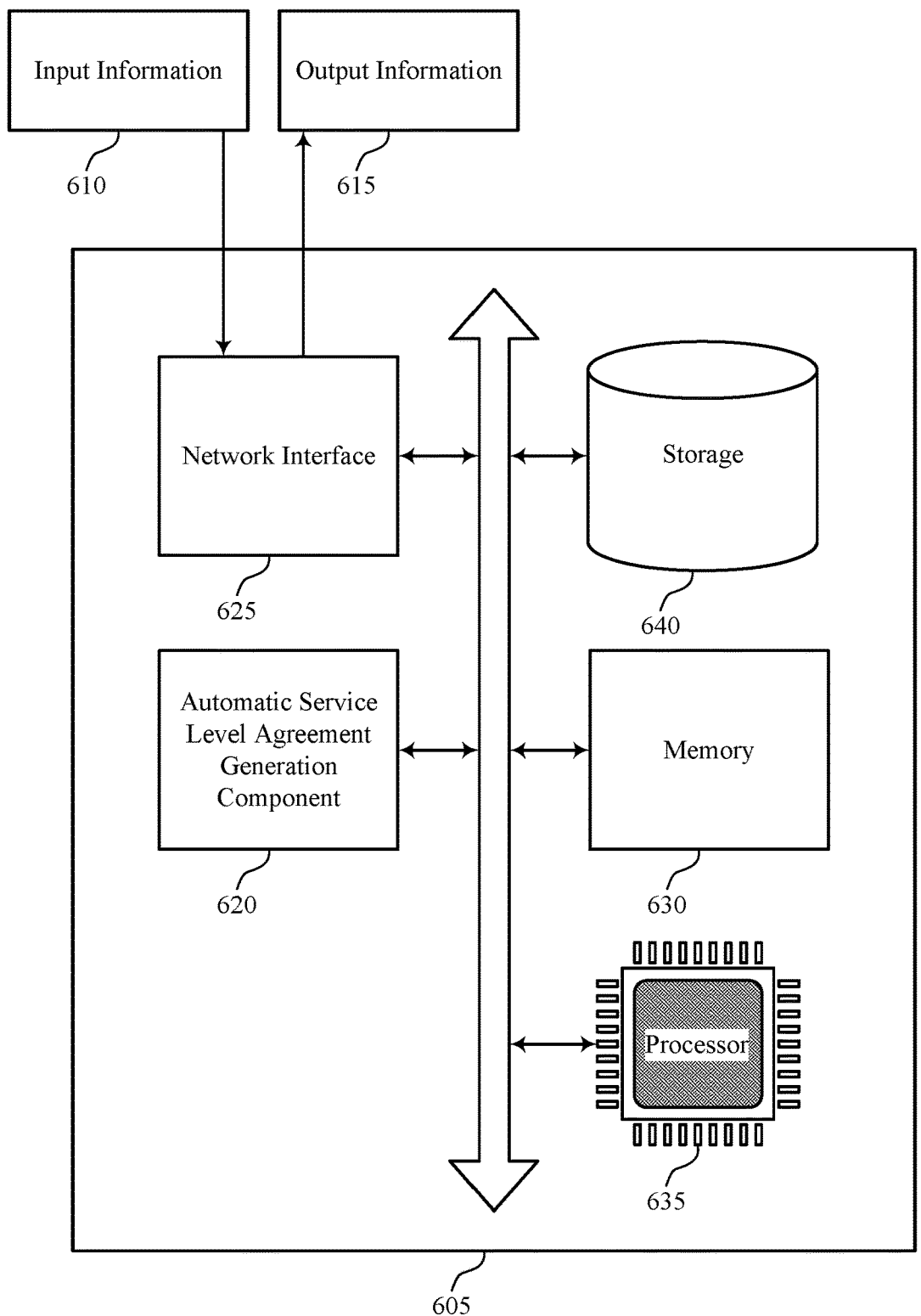
FIG. 6 illustrates a diagram of a system including a device that supports techniques for automatic service level agreement generation in accordance with aspects of the present disclosure.

FIG. 6 illustrates a block diagram 600 of a system 605 that supports techniques for automatic service level agreement generation in accordance with aspects of the present disclosure. The system 605 may be an example of or include the components of a system 405 as described herein. The system 605 may include components for data management, including components such as an automatic service level agreement generation component 620, an input information 610, an output information 615, a network interface 625, a memory 630, a processor 635, and a storage 640. These components may be in electronic communication or otherwise coupled with each other (e.g., operatively, communicatively, functionally, electronically, electrically: via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120) as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting techniques for automatic service level agreement generation). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640) may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

The automatic service level agreement generation component 620 may support automatic service level agreement generation in accordance with examples as disclosed herein. For example, the automatic service level agreement generation component 620 may be configured as or otherwise support a means for receiving, at a data management system, a request to backup data from a source data storage environment to a target data storage environment. The automatic service level agreement generation component 620 may be configured as or otherwise support a means for inputting first workload metadata associated with backing up the data from the source data storage environment to the target data storage environment into a machine learning model that is trained using second workload metadata associated with a set of multiple workloads managed by the data management system. The automatic service level agreement generation component 620 may be configured as or otherwise support a means for generating, via the machine learning model and in response to the request, one or more service level agreement configurations for backing up the data from the source data storage environment to the target data storage environment. The automatic service level agreement generation component 620 may be configured as or otherwise support a means for performing the backup of the data from the source data storage environment to the target data storage environment in accordance with at least one of the one or more service level agreement configurations.

By including or configuring the automatic service level agreement generation component 620 in accordance with examples as described herein, the system 605 may support techniques for techniques for automatic service level agreement generation, which may provide one or more benefits such as, for example, enhanced backup of data from a source data storage environment to a target data storage environment, reduced latency for data backup, and improved user experience, among other possibilities.

Figure 7:
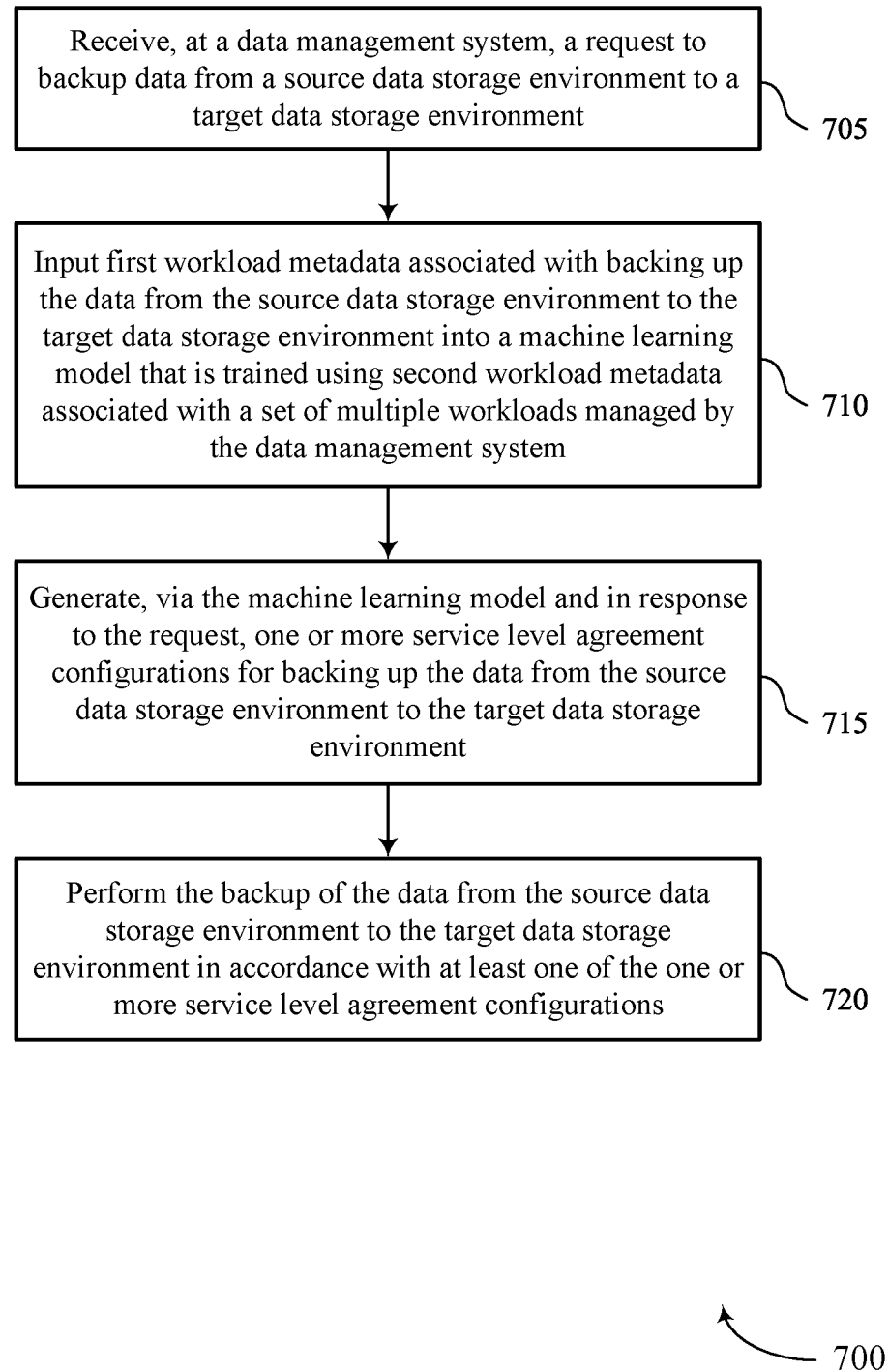
FIGS. 7 through 10 illustrate flowcharts showing methods that support techniques for automatic service level agreement generation in accordance with aspects of the present disclosure.

FIG. 7 illustrates a flowchart showing a method 700 that supports techniques for automatic service level agreement generation in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving, at a data management system, a request to backup data from a source data storage environment to a target data storage environment. The operations of 705 may be performed in accordance with examples as disclosed herein. In some examples, aspects of the operations of 705 may be performed by a backup request component 525 as described with reference to FIG. 5.

At 710, the method may include inputting first workload metadata associated with backing up the data from the source data storage environment to the target data storage environment into a machine learning model that is trained using second workload metadata associated with a set of multiple workloads managed by the data management system. The operations of 710 may be performed in accordance with examples as disclosed herein. In some examples, aspects of the operations of 710 may be performed by a workload component 530 as described with reference to FIG. 5.

At 715, the method may include generating, via the machine learning model and in response to the request, one or more service level agreement configurations for backing up the data from the source data storage environment to the target data storage environment. The operations of 715 may be performed in accordance with examples as disclosed herein. In some examples, aspects of the operations of 715 may be performed by a service level agreement component 535 as described with reference to FIG. 5.

At 720, the method may include performing the backup of the data from the source data storage environment to the target data storage environment in accordance with at least one of the one or more service level agreement configurations. The operations of 720 may be performed in accordance with examples as disclosed herein. In some examples, aspects of the operations of 720 may be performed by a backup component 540 as described with reference to FIG. 5.

Figure 8:
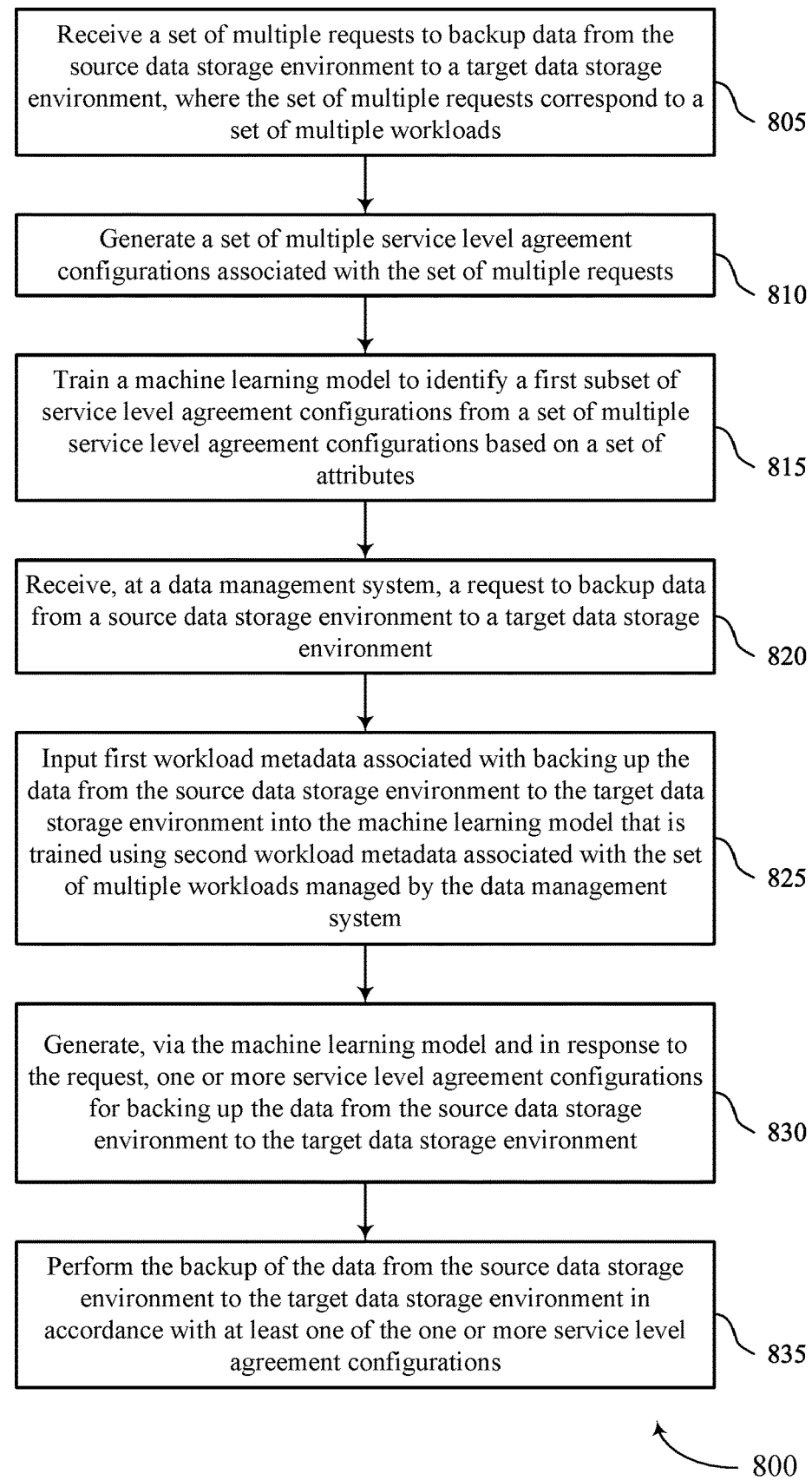

FIG. 8 illustrates a flowchart showing a method 800 that supports techniques for automatic service level agreement generation in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include receiving a set of multiple requests to backup data from the source data storage environment to a target data storage environment, where the set of multiple requests correspond to a set of multiple workloads. The operations of 805 may be performed in accordance with examples as disclosed herein. In some examples, aspects of the operations of 805 may be performed by a backup request component 525 as described with reference to FIG. 5.

At 810, the method may include generating a set of multiple service level agreement configurations associated with the set of multiple requests. The operations of 810 may be performed in accordance with examples as disclosed herein. In some examples, aspects of the operations of 810 may be performed by a service level agreement component 535 as described with reference to FIG. 5.

At 815, the method may include training a machine learning model to identify a first subset of service level agreement configurations from a set of multiple service level agreement configurations based on a set of attributes. The operations of 815 may be performed in accordance with examples as disclosed herein. In some examples, aspects of the operations of 815 may be performed by a model training component 555 as described with reference to FIG. 5.

At 820, the method may include receiving, at a data management system, a request to backup data from a source data storage environment to a target data storage environment. The operations of 820 may be performed in accordance with examples as disclosed herein. In some examples, aspects of the operations of 820 may be performed by a backup request component 525 as described with reference to FIG. 5.

At 825, the method may include inputting first workload metadata associated with backing up the data from the source data storage environment to the target data storage environment into the machine learning model that is trained using second workload metadata associated with the set of multiple workloads managed by the data management system. The operations of 825 may be performed in accordance with examples as disclosed herein. In some examples, aspects of the operations of 825 may be performed by a workload component 530 as described with reference to FIG. 5.

At 830, the method may include generating, via the machine learning model and in response to the request, one or more service level agreement configurations for backing up the data from the source data storage environment to the target data storage environment. The operations of 830 may be performed in accordance with examples as disclosed herein. In some examples, aspects of the operations of 830 may be performed by a service level agreement component 535 as described with reference to FIG. 5.

At 835, the method may include performing the backup of the data from the source data storage environment to the target data storage environment in accordance with at least one of the one or more service level agreement configurations. The operations of 835 may be performed in accordance with examples as disclosed herein. In some examples, aspects of the operations of 835 may be performed by a backup component 540 as described with reference to FIG. 5.

Figure 9:
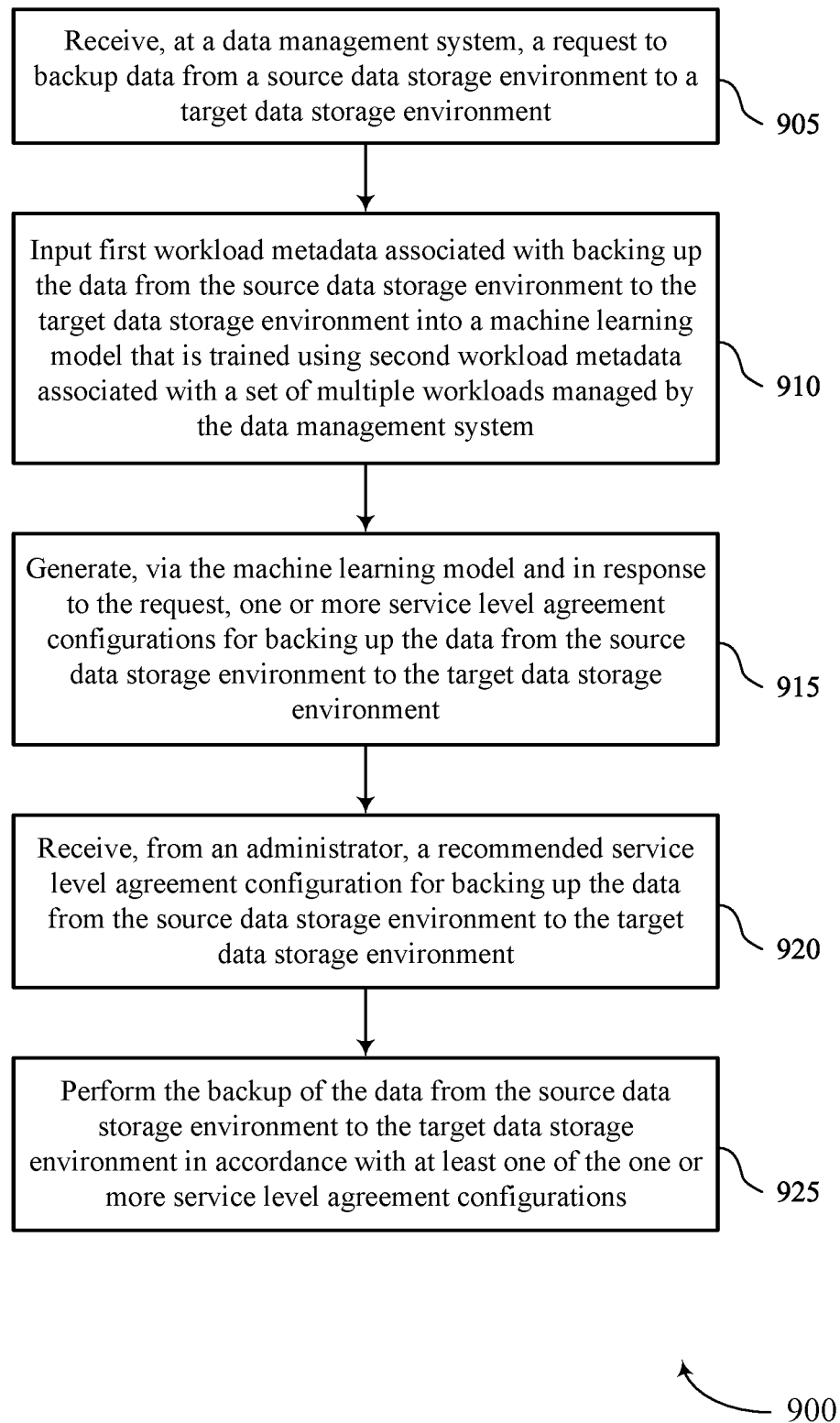

FIG. 9 illustrates a flowchart showing a method 900 that supports techniques for automatic service level agreement generation in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include receiving, at a data management system, a request to backup data from a source data storage environment to a target data storage environment. The operations of 905 may be performed in accordance with examples as disclosed herein. In some examples, aspects of the operations of 905 may be performed by a backup request component 525 as described with reference to FIG. 5.

At 910, the method may include inputting first workload metadata associated with backing up the data from the source data storage environment to the target data storage environment into a machine learning model that is trained using second workload metadata associated with a set of multiple workloads managed by the data management system. The operations of 910 may be performed in accordance with examples as disclosed herein. In some examples, aspects of the operations of 910 may be performed by a workload component 530 as described with reference to FIG. 5.

At 915, the method may include generating, via the machine learning model and in response to the request, one or more service level agreement configurations for backing up the data from the source data storage environment to the target data storage environment. The operations of 915 may be performed in accordance with examples as disclosed herein. In some examples, aspects of the operations of 915 may be performed by a service level agreement component 535 as described with reference to FIG. 5.

At 920, the method may include receiving, from an administrator, a recommended service level agreement configuration for backing up the data from the source data storage environment to the target data storage environment. The operations of 920 may be performed in accordance with examples as disclosed herein. In some examples, aspects of the operations of 920 may be performed by a service level agreement component 535 as described with reference to FIG. 5.

At 925, the method may include performing the backup of the data from the source data storage environment to the target data storage environment in accordance with at least one of the one or more service level agreement configurations. The operations of 925 may be performed in accordance with examples as disclosed herein. In some examples, aspects of the operations of 925 may be performed by a backup component 540 as described with reference to FIG. 5.

Figure 10:
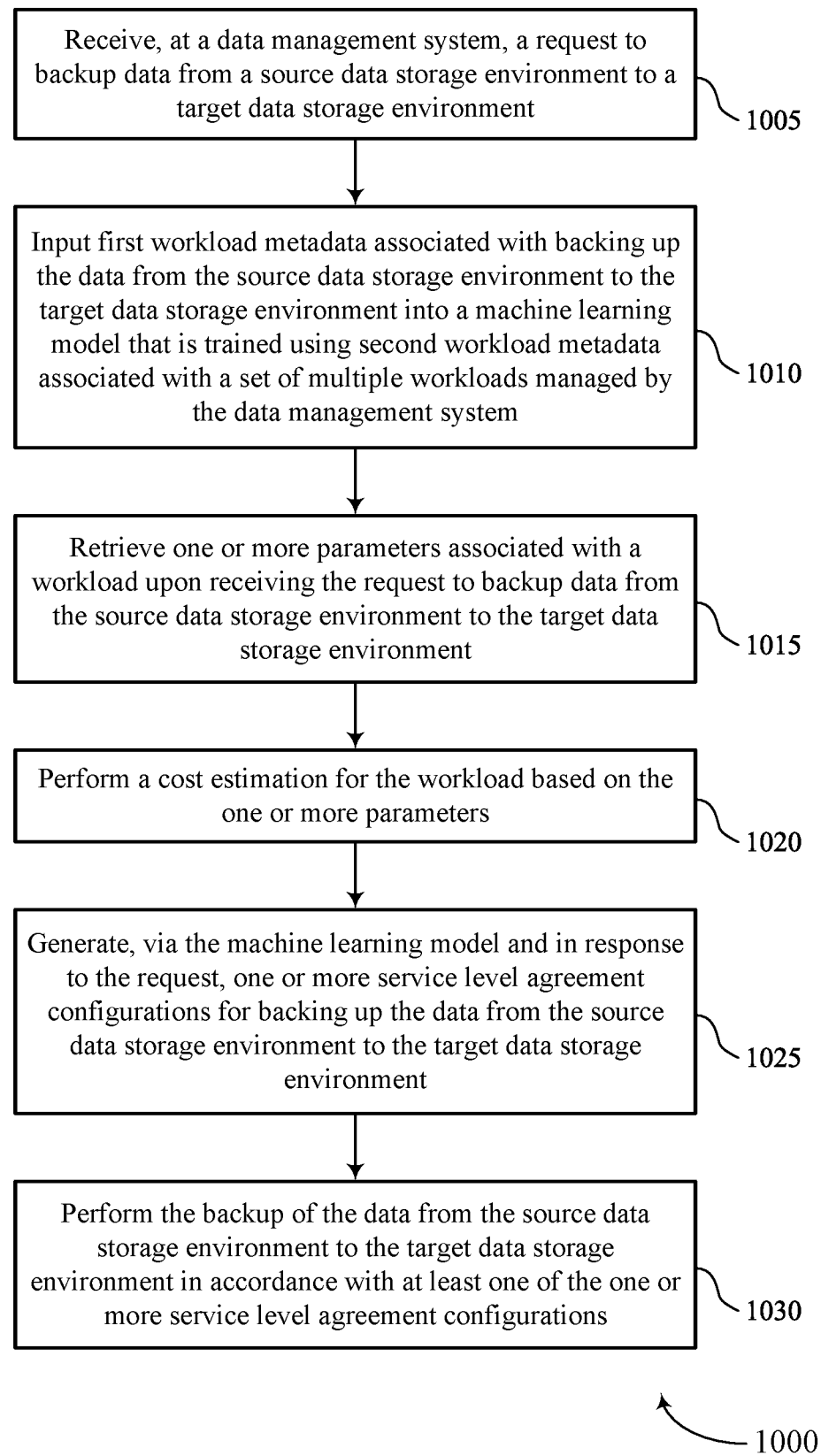

FIG. 10 illustrates a flowchart showing a method 1000 that supports techniques for automatic service level agreement generation in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include receiving, at a data management system, a request to backup data from a source data storage environment to a target data storage environment. The operations of 1005 may be performed in accordance with examples as disclosed herein. In some examples, aspects of the operations of 1005 may be performed by a backup request component 525 as described with reference to FIG. 5.

At 1010, the method may include inputting first workload metadata associated with backing up the data from the source data storage environment to the target data storage environment into a machine learning model that is trained using second workload metadata associated with a set of multiple workloads managed by the data management system. The operations of 1010 may be performed in accordance with examples as disclosed herein. In some examples, aspects of the operations of 1010 may be performed by a workload component 530 as described with reference to FIG. 5.

At 1015, the method may include retrieving one or more parameters associated with a workload upon receiving the request to backup data from the source data storage environment to the target data storage environment. The operations of 1015 may be performed in accordance with examples as disclosed herein. In some examples, aspects of the operations of 1015 may be performed by a workload component 530 as described with reference to FIG. 5.

At 1020, the method may include performing a cost estimation for the workload based on the one or more parameters. The operations of 1020 may be performed in accordance with examples as disclosed herein. In some examples, aspects of the operations of 1020 may be performed by a cost estimation component 545 as described with reference to FIG. 5.

At 1025, the method may include generating, via the machine learning model and in response to the request, one or more service level agreement configurations for backing up the data from the source data storage environment to the target data storage environment. The operations of 1025 may be performed in accordance with examples as disclosed herein. In some examples, aspects of the operations of 1025 may be performed by a service level agreement component 535 as described with reference to FIG. 5.

At 1030, the method may include performing the backup of the data from the source data storage environment to the target data storage environment in accordance with at least one of the one or more service level agreement configurations. The operations of 1030 may be performed in accordance with examples as disclosed herein. In some examples, aspects of the operations of 1030 may be performed by a backup component 540 as described with reference to FIG. 5.

A method for automatic service level agreement generation is described. The method may include receiving, at a data management system, a request to backup data from a source data storage environment to a target data storage environment, inputting first workload metadata associated with backing up the data from the source data storage environment to the target data storage environment into a machine learning model that is trained using second workload metadata associated with a set of multiple workloads managed by the data management system, generating, via the machine learning model and in response to the request, one or more service level agreement configurations for backing up the data from the source data storage environment to the target data storage environment, and performing the backup of the data from the source data storage environment to the target data storage environment in accordance with at least one of the one or more service level agreement configurations.

An apparatus for automatic service level agreement generation is described. The apparatus may include a processor, memory coupled with the processor, and instructions stored in the memory. The instructions may be executable by the processor to cause the apparatus to receive, at a data management system, a request to backup data from a source data storage environment to a target data storage environment, input first workload metadata associated with backing up the data from the source data storage environment to the target data storage environment into a machine learning model that is trained using second workload metadata associated with a set of multiple workloads managed by the data management system, generate, via the machine learning model and in response to the request, one or more service level agreement configurations for backing up the data from the source data storage environment to the target data storage environment, and perform the backup of the data from the source data storage environment to the target data storage environment in accordance with at least one of the one or more service level agreement configurations.

Another apparatus for automatic service level agreement generation is described. The apparatus may include means for receiving, at a data management system, a request to backup data from a source data storage environment to a target data storage environment, means for inputting first workload metadata associated with backing up the data from the source data storage environment to the target data storage environment into a machine learning model that is trained using second workload metadata associated with a set of multiple workloads managed by the data management system, means for generating, via the machine learning model and in response to the request, one or more service level agreement configurations for backing up the data from the source data storage environment to the target data storage environment, and means for performing the backup of the data from the source data storage environment to the target data storage environment in accordance with at least one of the one or more service level agreement configurations.

A non-transitory computer-readable medium storing code for automatic service level agreement generation is described. The code may include instructions executable by a processor to receive, at a data management system, a request to backup data from a source data storage environment to a target data storage environment, input first workload metadata associated with backing up the data from the source data storage environment to the target data storage environment into a machine learning model that is trained using second workload metadata associated with a set of multiple workloads managed by the data management system, generate, via the machine learning model and in response to the request, one or more service level agreement configurations for backing up the data from the source data storage environment to the target data storage environment, and perform the backup of the data from the source data storage environment to the target data storage environment in accordance with at least one of the one or more service level agreement configurations.

Some examples of the method, apparatuses, and non-transitory computer-readable medium described herein may further include operations, features, means, or instructions for receiving a set of multiple requests to backup data from the source data storage environment to a target data storage environment, where the set of multiple requests correspond to the set of multiple workloads and generating a set of multiple service level agreement configurations associated with the set of multiple requests.

Some examples of the method, apparatuses, and non-transitory computer-readable medium described herein may further include operations, features, means, or instructions for training the machine learning model to identify a first subset of service level agreement configurations from the set of multiple service level agreement configurations based on a set of attributes.

Some examples of the method, apparatuses, and non-transitory computer-readable medium described herein may further include operations, features, means, or instructions for storing the first subset of service level agreement configurations at the data management system.

In some examples of the method, apparatuses, and non-transitory computer-readable medium described herein, the set of attributes includes at least one of a set of retention day's per snapshot, a set of archival days per snapshot, replication information per snapshot, a set of cost configurations for one or more cloud environments, a set of multiple snapshot sizes per service level agreement per snapshot, an industry associated with a customer, a business priority associated with the first workload, or a combination thereof.

Some examples of the method, apparatuses, and non-transitory computer-readable medium described herein may further include operations, features, means, or instructions for receiving, from an administrator, a recommended service level agreement configuration for backing up the data from the source data storage environment to the target data storage environment.

Some examples of the method, apparatuses, and non-transitory computer-readable medium described herein may further include operations, features, means, or instructions for retrieving one or more parameters associated with a workload upon receiving the request to backup data from the source data storage environment to the target data storage environment and performing a cost estimation for the workload based on the one or more parameters.

In some examples of the method, apparatuses, and non-transitory computer-readable medium described herein, the one or more parameters include at least one of a set of multiple workload sizes, a set of multiple read trends, a set of multiple write trends, a resource usage, a capacity, a set of multiple licenses, or a combination thereof.

In some examples of the method, apparatuses, and non-transitory computer-readable medium described herein, periodically performing an assessment of the one or more service level agreement configurations and updating at least one of the one or more service level agreement configurations based on the assessment. In some examples of the method, apparatuses, and non-transitory computer-readable medium described herein, the machine learning model includes a K-means clustering algorithm.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for automatic service level agreement generation, comprising:
    receiving, at a data management system, a request to backup data from a source data storage environment to a target data storage environment;
    inputting first workload metadata associated with backing up the data from the source data storage environment to the target data storage environment into a machine learning model that is trained using second workload metadata associated with a plurality of workloads managed by the data management system;
    generating, via the machine learning model and in response to the request, one or more service level agreement configurations for backing up the data from the source data storage environment to the target data storage environment, wherein generating the one or more service level agreement configurations is based at least in part on the first workload metadata; and
    performing the backup of the data from the source data storage environment to the target data storage environment in accordance with at least one of the one or more service level agreement configurations.

2. The method of claim 1, further comprising:
    receiving a plurality of requests to backup data from the source data storage environment to a target data storage environment, wherein the plurality of requests correspond to the plurality of workloads; and
    generating a plurality of service level agreement configurations associated with the plurality of requests.

3. The method of claim 2, further comprising:
    training the machine learning model to identify a first subset of service level agreement configurations from the plurality of service level agreement configurations based at least in part on a set of attributes.

4. The method of claim 3, further comprising:
    storing the first subset of service level agreement configurations at the data management system.

5. The method of claim 3, wherein the set of attributes comprises at least one of a set of retention days per snapshot, a set of archival days per snapshot, replication information per snapshot, a set of cost configurations for one or more cloud environments, a plurality of snapshot sizes per service level agreement per snapshot, an industry associated with a customer, a business priority associated with the first workload, or a combination thereof.

6. The method of claim 1, further comprising:
    receiving, from an administrator, a recommended service level agreement configuration for backing up the data from the source data storage environment to the target data storage environment.

7. The method of claim 1, further comprising:
    retrieving one or more parameters associated with a workload upon receiving the request to backup data from the source data storage environment to the target data storage environment; and
    performing a cost estimation for the workload based at least in part on the one or more parameters.

8. The method of claim 7, wherein the one or more parameters comprise at least one of a plurality of workload sizes, a plurality of read trends, a plurality of write trends, a resource usage, a capacity, a plurality of licenses, or a combination thereof.

9. The method of claim 1, further comprising:
    periodically performing an assessment of the one or more service level agreement configurations; and
    updating at least one of the one or more service level agreement configurations based at least in part on the assessment.

10. The method of claim 1, wherein the machine learning model comprises a K-means clustering algorithm.

11. An apparatus for automatic service level agreement generation, comprising:
    a processor;
    memory coupled with the processor; and
    instructions stored in the memory and executable by the processor to cause the apparatus to:
        receive, at a data management system, a request to backup data from a source data storage environment to a target data storage environment;
        input first workload metadata associated with backing up the data from the source data storage environment to the target data storage environment into a machine learning model that is trained using second workload metadata associated with a plurality of workloads managed by the data management system;
        generate, via the machine learning model and in response to the request, one or more service level agreement configurations for backing up the data from the source data storage environment to the target data storage environment, wherein generating the one or more service level agreement configurations is based at least in part on the first workload metadata; and
        perform the backup of the data from the source data storage environment to the target data storage environment in accordance with at least one of the one or more service level agreement configurations.

12. The apparatus of claim 11, wherein the instructions are further executable by the processor to cause the apparatus to:
    receive a plurality of requests to backup data from the source data storage environment to a target data storage environment, wherein the plurality of requests correspond to the plurality of workloads; and
    generate a plurality of service level agreement configurations associated with the plurality of requests.

13. The apparatus of claim 12, wherein the instructions are further executable by the processor to cause the apparatus to:

train the machine learning model to identify a first subset of service level agreement configurations from the plurality of service level agreement configurations based at least in part on a set of attributes.

14. The apparatus of claim 13, wherein the instructions are further executable by the processor to cause the apparatus to:
store the first subset of service level agreement configurations at the data management system.

15. The apparatus of claim 13, wherein the set of attributes comprises at least one of a set of retention days per snapshot, a set of archival days per snapshot, replication information per snapshot, a set of cost configurations for one or more cloud environments, a plurality of snapshot sizes per service level agreement per snapshot, an industry associated with a customer, a business priority associated with the first workload, or a combination thereof.

16. The apparatus of claim 11, wherein the instructions are further executable by the processor to cause the apparatus to:
receive, from an administrator, a recommended service level agreement configuration for backing up the data from the source data storage environment to the target data storage environment.

17. The apparatus of claim 11, wherein the instructions are further executable by the processor to cause the apparatus to:
retrieve one or more parameters associated with a workload upon receiving the request to backup data from the source data storage environment to the target data storage environment; and
perform a cost estimation for the workload based at least in part on the one or more parameters.

18. The apparatus of claim 17, wherein the one or more parameters comprise at least one of a plurality of workload sizes, a plurality of read trends, a plurality of write trends, a resource usage, a capacity, a plurality of licenses, or a combination thereof.

19. The apparatus of claim 11, wherein the instructions are further executable by the processor to cause the apparatus to:
periodically perform an assessment of the one or more service level agreement configurations; and
update at least one of the one or more service level agreement configurations based at least in part on the assessment.

20. A non-transitory computer-readable medium storing code for automatic service level agreement generation, the code comprising instructions executable by a processor to:
receive, at a data management system, a request to backup data from a source data storage environment to a target data storage environment;
input first workload metadata associated with backing up the data from the source data storage environment to the target data storage environment into a machine learning model that is trained using second workload metadata associated with a plurality of workloads managed by the data management system;
generate, via the machine learning model and in response to the request, one or more service level agreement configurations for backing up the data from the source data storage environment to the target data storage environment, wherein generating the one or more service level agreement configurations is based at least in part on the first workload metadata; and
perform the backup of the data from the source data storage environment to the target data storage environment in accordance with at least one of the one or more service level agreement configurations.

* * * * *